United States Patent
Lewis et al.

(10) Patent No.: US 11,550,464 B2
(45) Date of Patent: *Jan. 10, 2023

(54) CROSS-APPLICATION CONTENT PLAYER

(71) Applicant: Google LLC, Mountain View, CA (US)

(72) Inventors: Justin Lewis, Marina del Rey, CA (US); Ruxandra Georgiana Davies, Santa Monica, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,441

(22) Filed: Aug. 17, 2021

(65) Prior Publication Data

US 2021/0373756 A1    Dec. 2, 2021

Related U.S. Application Data

(63) Continuation of application No. 16/853,220, filed on Apr. 20, 2020, which is a continuation of application No. 14/838,216, filed on Aug. 27, 2015, now Pat. No. 10,628,016.

(51) Int. Cl.
*G06F 3/04847* (2022.01)
*G06F 3/0488* (2022.01)
(Continued)

(52) U.S. Cl.
CPC ........ *G06F 3/04847* (2013.01); *G06F 3/0482* (2013.01); *G06F 3/0488* (2013.01);
(Continued)

(58) Field of Classification Search
CPC .. G06F 3/04847; G06F 3/0482; G06F 3/0488; G06F 16/44; H04L 65/403; H04L 65/60; H04N 21/2393; H04N 21/47217
See application file for complete search history.

(56) References Cited

U.S. PATENT DOCUMENTS

| | | |
|---|---|---|
| 6,248,946 B1 | 6/2001 | Dwek |
| 7,890,854 B2 | 2/2011 | Chasen et al. |

(Continued)

FOREIGN PATENT DOCUMENTS

| | | |
|---|---|---|
| CN | 101681355 A | 3/2010 |
| CN | 102148857 A | 8/2011 |

(Continued)

OTHER PUBLICATIONS

USPTO, Office Action for U.S. Appl. No. 14/838,216, dated Feb. 7, 2018.

(Continued)

*Primary Examiner* — Maryam M Ipakchi
(74) *Attorney, Agent, or Firm* — Lowenstein Sandler LLP

(57) ABSTRACT

A method for providing a cross-application content player is disclosed. The method includes receiving, during playback of a content item in a first content player within a first user interface of a first mobile application, an indication of a user request pertaining to a second mobile application, wherein the first mobile application is associated with a first platform, and the second mobile application is associated with a second platform. The method further includes identifying a play state of the content item corresponding to the user request, and causing playback of the content item in a second content player within a second user interface of the second mobile application based on the play state.

24 Claims, 11 Drawing Sheets

(51) Int. Cl.
  *G06F 3/0482* (2013.01)
  *H04L 65/403* (2022.01)
  *H04L 65/60* (2022.01)
  *G06F 16/44* (2019.01)
(52) U.S. Cl.
  CPC ............ *G06F 16/44* (2019.01); *H04L 65/403* (2013.01); *H04L 65/60* (2013.01)

(56) References Cited

U.S. PATENT DOCUMENTS

| | | | |
|---|---|---|---|
| 7,996,566 | B1 | 8/2011 | Sylvain et al. |
| 2008/0301280 | A1 | 12/2008 | Chasen et al. |
| 2012/0117193 | A1 | 5/2012 | Phillips |
| 2012/0184362 | A1 | 7/2012 | Barclay et al. |
| 2014/0195616 | A1 | 7/2014 | Sun |
| 2015/0149565 | A1* | 5/2015 | Ahmed ............... H04L 65/4007 709/204 |
| 2016/0110830 | A1* | 4/2016 | Shapira ............. G06Q 30/0617 705/26.43 |

FOREIGN PATENT DOCUMENTS

| | | |
|---|---|---|
| CN | 102422314 A | 4/2012 |
| CN | 103179146 A | 6/2013 |
| CN | 103190092 A | 7/2013 |
| CN | 103514924 A | 1/2014 |
| WO | 2012154169 A1 | 11/2012 |
| WO | 2015023693 A1 | 2/2015 |

OTHER PUBLICATIONS

USPTO, Final Office Action for U.S. Appl. No. 14/838,216, dated Jul. 9, 2018.
USPTO, Office Action for U.S. Appl. No. 14/838,216, dated Jan. 18, 2019.
USPTO, Final Office Action for U.S. Appl. No. 14/838,216, dated May 3, 2019.
USPTO, Advisory Action for U.S. Appl. No. 14/838,216, dated Oct. 2, 2018.
USPTO, Notice of Allowance for U.S. Appl. No. 14/838,216, dated Dec. 18, 2019.
Bringer, FVPlayer-floating video player, Sep. 13, 2013, 2 pages, https://play.google.com/store/apps/details?id=com.bringer.fvplayer&hl=en.
International Searching Authority, "Notification of Transmittal of the International Search Report and the Written Opinion of the International Search Authority, or the Declaration," for International Application No. PCT/US2016/048189, dated Nov. 8, 2016, 12 pages.
EPO Office Action for Application No. EP16766700, dated Jun. 3, 2019, 7 pages.
EPO Office Action for Application No. EP16766700, dated Apr. 8, 2021, 6 pages.
CN Office Action for Application No. 201680030367.5, dated Jan. 21, 2020.
CN Office Action for Application No. 201680030367.5, dated Jul. 17, 2020.
Li Ma, et al. "Research and development of mobile application for Android platform" International Journal of Multimedia Ubiquitous Engineering, dated Dec. 31, 2014, 12 pgs.
Suangge Li, "Research and Implementation of Android-based IoT Application Architecture" Chinese Masters Dissertations Full-Text Database (Information Science and Technology Series) dated Apr. 15, 2015, 67 pgs.
CN Office Action for Application No. 202110038735.3, dated Sep. 6, 2022, 33 pgs.

\* cited by examiner

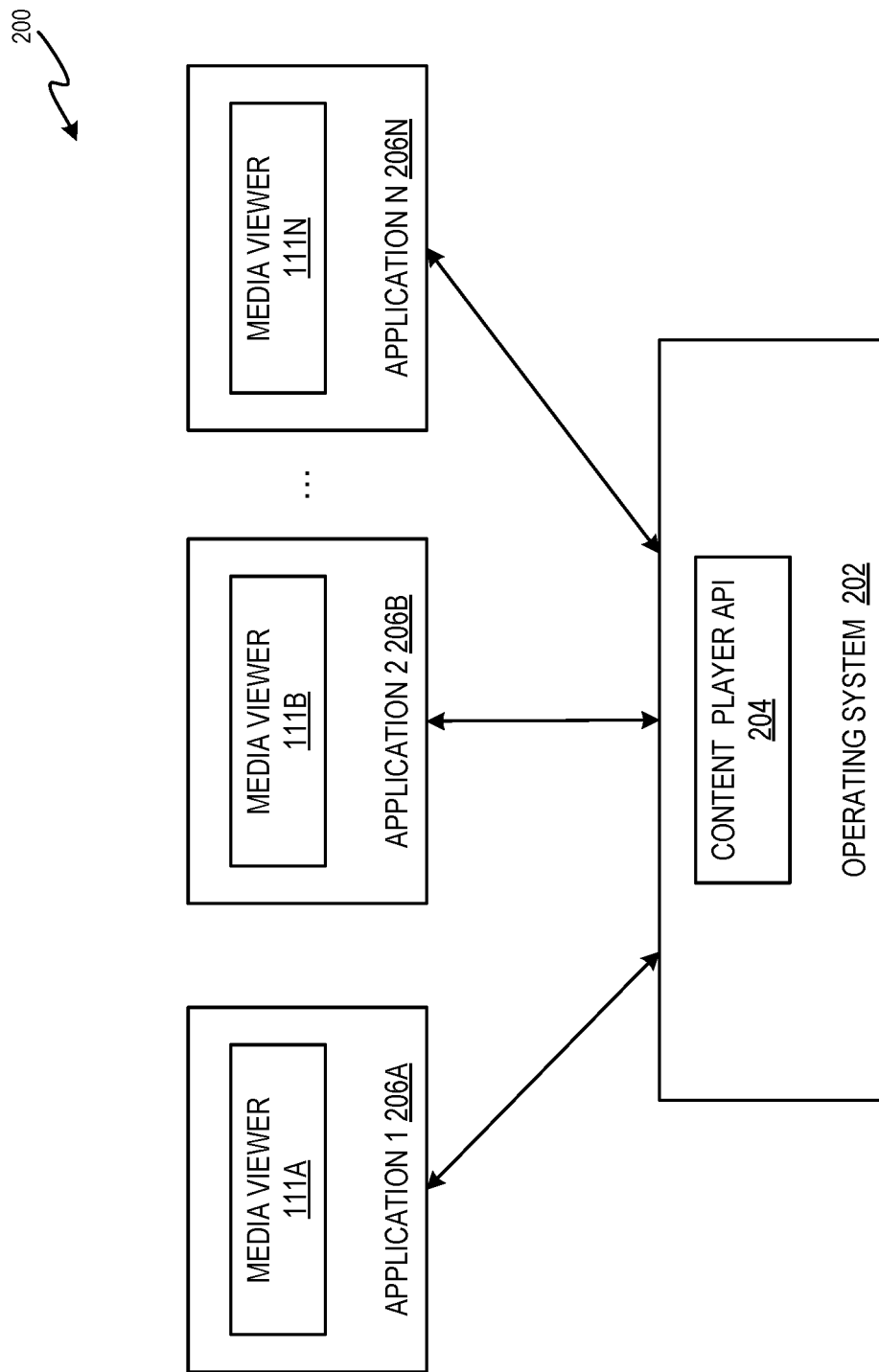

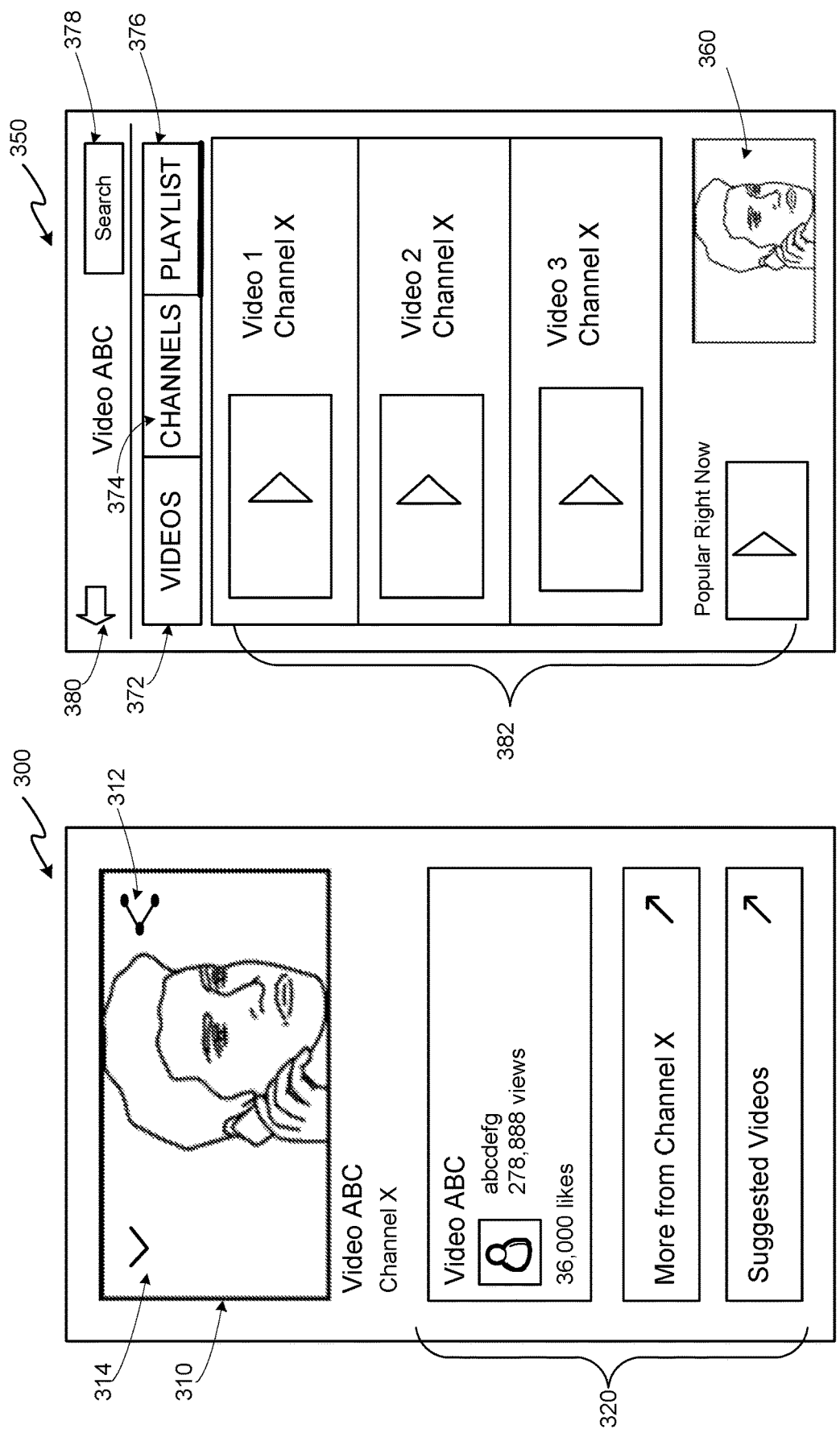

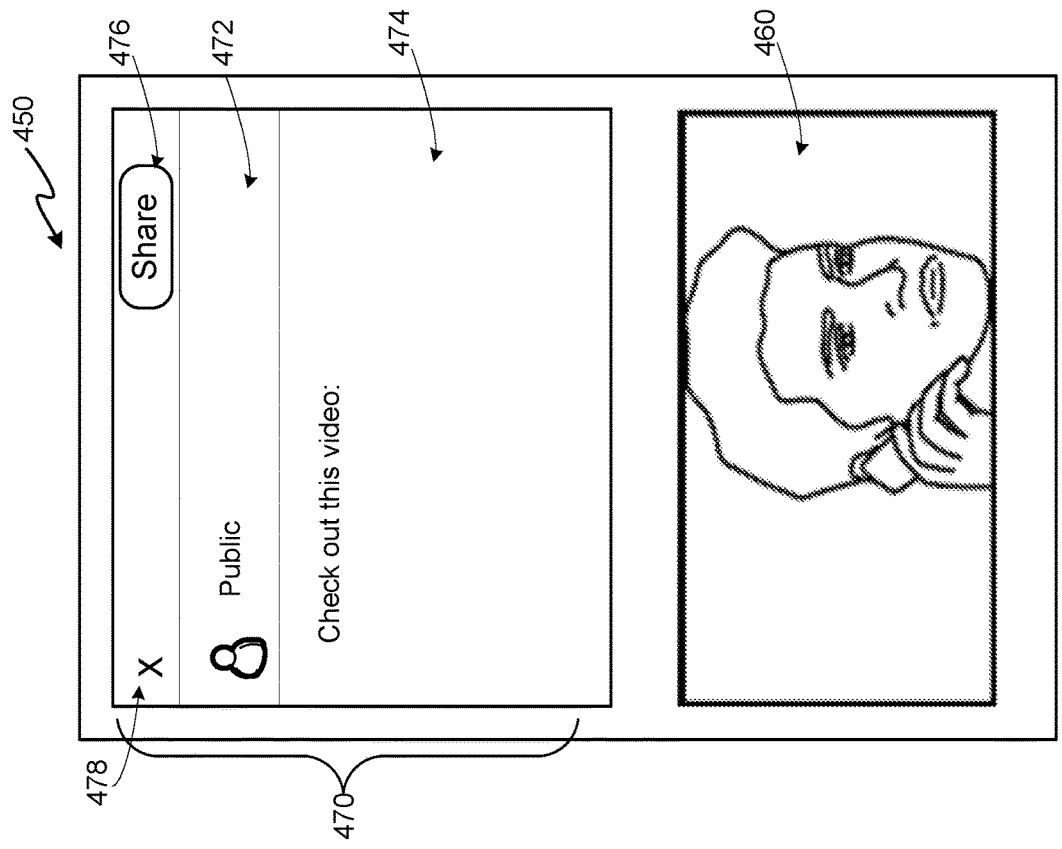
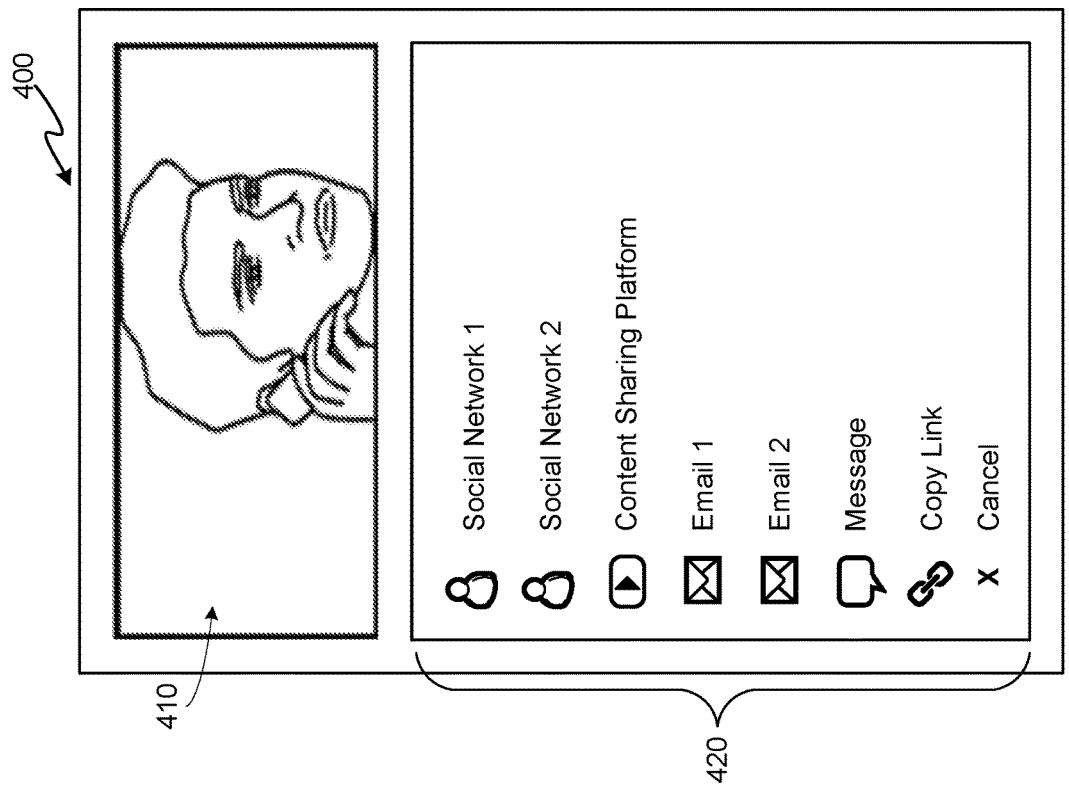
FIG. 4

CROSS-APPLICATION CONTENT PLAYER

CROSS-APPLICATION CONTENT PLAYER

Related Application

The present application is a continuation application of U.S. patent application Ser. No. 16/853,220, filed on Apr. 20, 2020, which is a continuation application of U.S. patent application Ser. No. 14/838,216, filed on Aug. 27, 2015, now issued as U.S. Pat. No. 10,628,016, each of which is incorporated herein by reference in its entirety for all purposes.

TECHNICAL FIELD

This disclosure relates to the field of content sharing platform and, in particular, to a cross-application content player of a content sharing platform.

BACKGROUND

On the Internet, social networks allow users to connect to and share information with each other. Many social networks include a content sharing aspect that allows users to upload, view, and share content, such as video content, image content, audio content, and so on. Other users of the social network may comment on the shared content, discover new content, locate updates, share content, and otherwise interact with the provided content. The shared content may include content from professional content creators, e.g., movie clips, TV clips, and music videos, as well as content from amateur content creators, e.g., video blogging and short original videos.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for providing a cross-application content player is disclosed. The method includes receiving, during playback of a content item in a first content player within a first user interface of a first mobile application, an indication of a user request pertaining to a second mobile application, wherein the first mobile application is associated with a first platform, and the second mobile application is associated with a second platform. The method further includes identifying a play state of the content item corresponding to the user request, and causing playback of the content item in a second content player within a second user interface of the second mobile application based on the play state.

In one implementation, the method further includes: detecting an input event initiating sharing of the content item; and causing the content item to be shared in response to detecting the input event.

In one implementation, detecting the input event includes detecting a gesture to move the second content player within the second user interface.

In one implementation, causing the content item to be shared includes causing information related to the content item to be pasted in a text box in the second user interface.

In one implementation, the user request pertaining to the second application includes a request to share the content item using the second application.

In one implementation, the method further includes receiving a first indication to dismiss a notification interface, wherein the second user interface comprises the notification interface; and causing, by the processing device, playback of audio content associated with the content item in response to receiving the first indication.

In one implementation, the method further includes receiving a second indication to present the notification interface; and causing, by the processing device, playback of the audio content and video content associated with the content item in response to receiving the second indication.

In additional implementations, computing devices for performing the operations of the above-described implementations are also disclosed. Systems with a processing device and a memory including instructions that when executed by the processing devices cause the processing device to perform operations corresponding to the disclosed methods are also provided. Additionally, in some implementations of the present disclosure, a non-transitory computer-readable storage medium stores instructions for performing the operations of the above-described implementations.

BRIEF DESCRIPTION OF THE DRAWINGS

The present disclosure is illustrated by way of example, and not by way of limitation, in the figures of the accompanying drawings.

FIG. 2A is a block diagram illustrating an example client device providing a cross-application content player in accordance with one implementation of the disclosure.

FIGS. 3-6 are example screenshots illustrating user interfaces for providing a cross-application content player.

DETAILED DESCRIPTION

Figure 1:
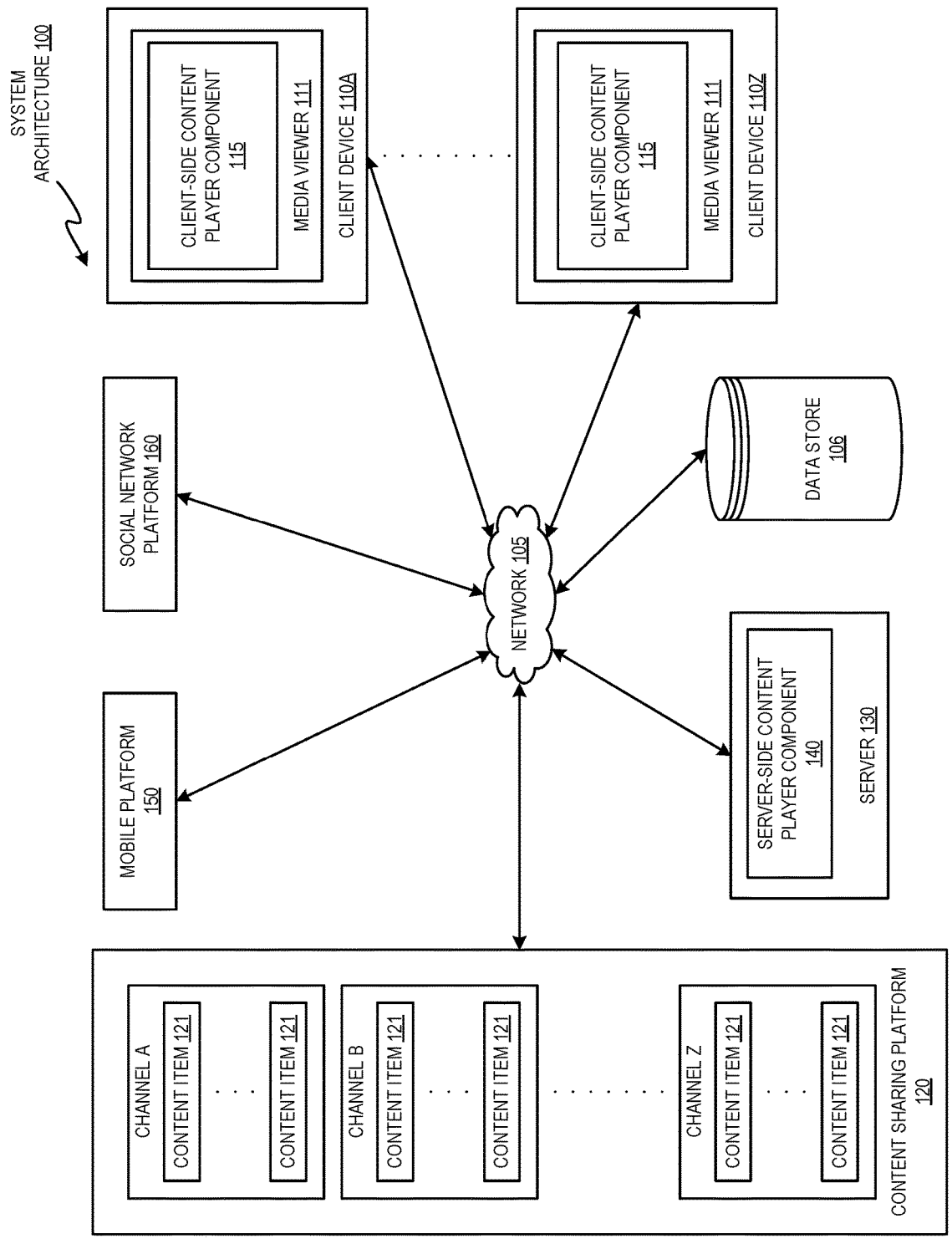
FIG. 1 illustrates an example of a system architecture, in accordance with one implementation of the disclosure.

Aspects and implementations of the disclosure are directed to content playback and sharing across applications such as across mobile applications associated with different platforms (e.g., a content sharing platform and a social network platform). Implementations are described for a cross-application content player that can provide playback of a content item (e.g., a video) on top of user interfaces of multiple applications. The cross-application content player can be persistently visible to a user when the user interacts with the applications.

As used herein, the term "content item" may refer to an electronic file that can be executed or loaded using software, firmware or hardware configured to present the content item to an entity. A content item may contain video content, audio content, text content, images, and/or any other content.

As referred to herein, an application can be and/or include one or more software programs that can run on a computing device (e.g. a rackmount server, a router computer, a server computer, a personal computer, a mainframe computer, a laptop computer, a tablet computer, a desktop computer, a mobile phone, a wearable computing device, etc.). An application can provide any functionality, such as content sharing, chat, email, messaging, mapping service, social networking service, and/or any other functionality.

Previously, content sharing platforms did not provide a solution for content playback across applications. For example, when consuming a video using an application of a conventional content sharing platform, a user may have to pause the playback of the video in order to share the video using a social network application. This can, for example, create a disjointed experience for the user, where the user has to choose between finishing watching the video and sharing the video.

Implementations of the disclosure address the above and other deficiencies by providing a cross-application content player that persists on top of user interfaces of multiple applications, when the user interacts with the applications. For example, while a user watches a video played in a user interface of a first application (e.g., a media viewer application provided by a content sharing platform) on a mobile phone, the user may initiate an interaction with a second application by, for example, selecting a video annotation (e.g., an overlay on the video that includes text, graphics, and/or any other content) directed to the second application (e.g., a social network application). The cross-application content player can continue playback of the video in a user interface of the second application uninterrupted. The user may then interact with the second application to share the video, chat with other users, etc. without interrupting playback of the video. In one implementation, the user may share the video with one or more other users by moving the cross-application player within the user interface of the second application (e.g., by dragging the cross-application player towards a text box that provides chat functionality to the user and the other users).

As such, implementations of the disclosure provide a content player that enables content items (e.g., videos) to be played on top of or embedded within another application with seamless transitions between application interfaces.

The present disclosure often references videos for simplicity and brevity. However, the teaching of the present disclosure are applied to content items generally and can be applied to various types of content or content items, including for example, video, audio, text, images, program instructions, etc. The content items referred to herein represent viewable and/or shareable content items.

FIG. 1 illustrates an example of a system architecture 100, in accordance with one implementation of the disclosure, for providing cross-application content playback functionality. The system architecture 100 includes client devices 110A through 110Z, a network 105, a data store 106, a content sharing platform 120, a server 130, a mobile platform 150, and a social network platform 160. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, netbook computers etc. In some implementations, client device 110A through 110Z may also be referred to as "user devices." Each client device can include a media viewer 111. In one implementation, the media viewers 111 can be applications that allow users to view content, such as images, videos, web pages, documents, etc. For example, the media viewer 111 can be a web browser that can access, retrieve, present, and/or navigate content (e.g., web pages such as Hyper Text Markup Language (HTML) pages, digital media items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a user interface. In another example, the media viewer 111 may be a standalone application that allows users to view digital media items (e.g., digital videos, digital images, electronic books, etc.). In some implementations, the media viewer 111 may provide one or more functions as will be described below using a widget, an application programming interface, and/or any other software component.

The media viewers 111 may be provided to the client devices 110A through 110Z by the server 130 and/or content sharing platform 120. For example, the media viewers 111 may be and/or include embedded media players that are embedded in web pages or any other user interface. In another example, the media viewers 111 may be and/or include applications that are downloaded from the server 130.

In general, functions described in one implementation as being performed by the content sharing platform 120 can also be performed on the client devices 110A through 110Z in other implementations if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with access to media items and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items. Content sharing platform 120 may include any type of content delivery network providing access to content and/or media items.

The content sharing platform 120 may include multiple channels (e.g., channels A through Z). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel.

Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. Once a user subscribes to a channel, the user can be presented with information from the channel's activity feed. An activity feed may be a list of recent activity associated with the user and occurring on the social network. If a user subscribes to multiple channels, the activity feed for each channel to which the user is subscribed can be combined into a syndicated activity feed. Information from the syndicated activity feed can be presented to the user. Although channels are described as one implementation of a content sharing platform, implementations of the disclosure are not limited to content sharing platforms that provide content items via a channel model.

Each channel may include one or more content items 121. Examples of a content item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, content item 121 is also referred to as a media item.

A content item 121 may be consumed via the Internet and/or via a mobile device application. As used herein, "media," "media item," "online media item," "digital media," "digital media item," "content," and "content item" can include an electronic file that can be executed or loaded using software, firmware or hardware configured to present the digital content item to an entity. In one implementation, the content sharing platform 120 may store the content items 121 using the data store 106.

Mobile platform 150 may be and/or include one or more computing devices (such as a rackmount server, a router computer, a server computer, a personal computer, a mainframe computer, a laptop computer, a tablet computer, a desktop computer, etc.), data stores, networks, software components, and/or hardware components that may be used to allow users to connect to, share information, and/or interact with each other using one or more mobile devices (e.g., mobile phones, tablet computers, laptop computers, wearable computing devices, etc.) and/or any other suitable device. For example, the mobile platform 150 may enable telephony communication, Short Message Service (SMS) messaging, Multimedia Message Service (MMS) messaging, text chat, video chat, and/or any other communication between users.

The mobile platform 150 may present to a user a listing (e.g., activity feed, feed, stream, wall, etc.) of objects (e.g., posts, content items (e.g., videos, images, audios, etc.), status updates, favorability indications, tags, messages, etc.) provided by other users of the mobile platform. The mobile platform 150 may also include a content sharing aspect that allow users to upload, view, tag, share, and/or perform any other function on content, such as text content, video content, image content, audio content, etc. Other users of the mobile platform 150 may comment on the shared content, discover new content, locate updates, share content, and otherwise interact with the provided content.

The social network platform 160 may be and/or include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to provide a user with content sharing services.

In one implementation, the content sharing platform 120 may be integrated with the mobile platform 150 and/or the social network platform 160. For example, the mobile platform 150 and/or the social network platform 160 may use the content sharing platform 120 to provide users with content sharing, content storage, content streaming, content processing, and/or any other service. In one example, a user of the mobile platform 150 and/or the social network platform 160 may upload and/or share content via the content sharing platform 120. In another implementation, the mobile platform 150 and the social network platform 160 may be separate from the content sharing platform 120.

In one implementation, the server 130 may be one or more computing devices (e.g., a rackmount server, a server computer, etc.). In one implementation, the server 130 may be included in the content sharing platform 120, the mobile platform 150, and/or the social network platform 160. In another implementation, the server 130 may be separate from one or more of the content sharing platform 120, the mobile platform 150, and the social network platform 160 but may communicate with (e.g., exchange data with) the content sharing platform 120, the mobile platform 150, and/or the social network platform 160.

In one implementation, the server 130 may include a server-side content player component 140. The media viewer 111 at the client device 110A-110Z can include a client-side content player component 115. The content player component 115, 140 may operate together to provide a cross-application content player viewable at one or more of client devices 110A-110Z. In other implementations, one or the other of the content player component 115, 140 may individually provide the cross-application content player viewable at one or more of client devices 110A-110Z.

In one implementation, the content player components 115 and/or 140 may generate the cross-application content player at the media viewer 111 to provide playback of a content item 121 of the content sharing platform 120 when a user of the client device 110a interacts with multiple applications. As an example, while the user interacts with a first application, the media viewer 111 can provide playback of the content item (e.g., a video) in a content player on top of a user interface of the first application. When the user starts interacting with a second application (e.g., a chat application), the media viewer 111 can provide the playback of the content item on top of a user interface of the second application. As such, the cross-application content player may be persistently visible to the user while the user interacts with multiple applications running on the client device.

The media viewer 111 can also provide the user with content sharing functionality while providing playback of the content in the cross-application content player. As an example, the media viewer 111 may cause the content item to be shared with one or more other users upon the user moving the cross-application content player into a text box or other user interface element provided by the first application and/or the second application.

Further description of the media viewer 111 and its specific functions is described in more detail below with respect to FIGS. 2A and 2B.

Although implementations of the disclosure are discussed in terms of content sharing platforms and promoting social network sharing of a content item on the content sharing platform, implementations may also be generally applied to any type of social network providing connections between users or to any type of content delivery platform providing content to end users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120, the server 130, the mobile platform 150, the social network platform 160, and/or any other component of the system 100.

FIG. 2A is a block diagram illustrating an example 200 of a client device in accordance with some implementations of the disclosure. As shown, client device 200 can include an operating system 202 and one or more applications 206A, 206B, and 206N running on operating system 202. While three applications are shown in FIG. 2A, this is merely illustrative. Any suitable number of applications can run on operating system 202 in accordance with implementations of the disclosure. Client device 200 can be the same as one or more of client devices 110*a-z* as described above in conjunction with FIG. 1.

Each of applications 206*a-n* can provide any suitable functionality, such as content sharing functionality, social networking functionality, messaging functionality, chat functionality, email functionality, mapping service, media playback functionality, etc. Each of applications 206*a*-206*n* can provide one or more user interfaces for presentation on a screen of client device 200. Applications 206*a*-206*n* can be provided by and/or associated with one or more suitable platforms. For example, one or more of the applications 206*a*-206*n* can be provided by a content sharing platform (e.g., the content sharing platform 120 of FIG. 1). As another example, one or more of the applications 206*a*-206*n* can be provided by and/or associated with a social network platform (e.g., the social network platform 160 of FIG. 1).

In some implementations, one or more applications 206*a*-206*n* can be mobile applications. As referred to herein, a mobile application can be and/or include one or more software programs that can run on a mobile device (e.g. a laptop computer, a tablet computer, a desktop computer, a mobile phone, a wearable computing device, etc.).

Figure 2B:
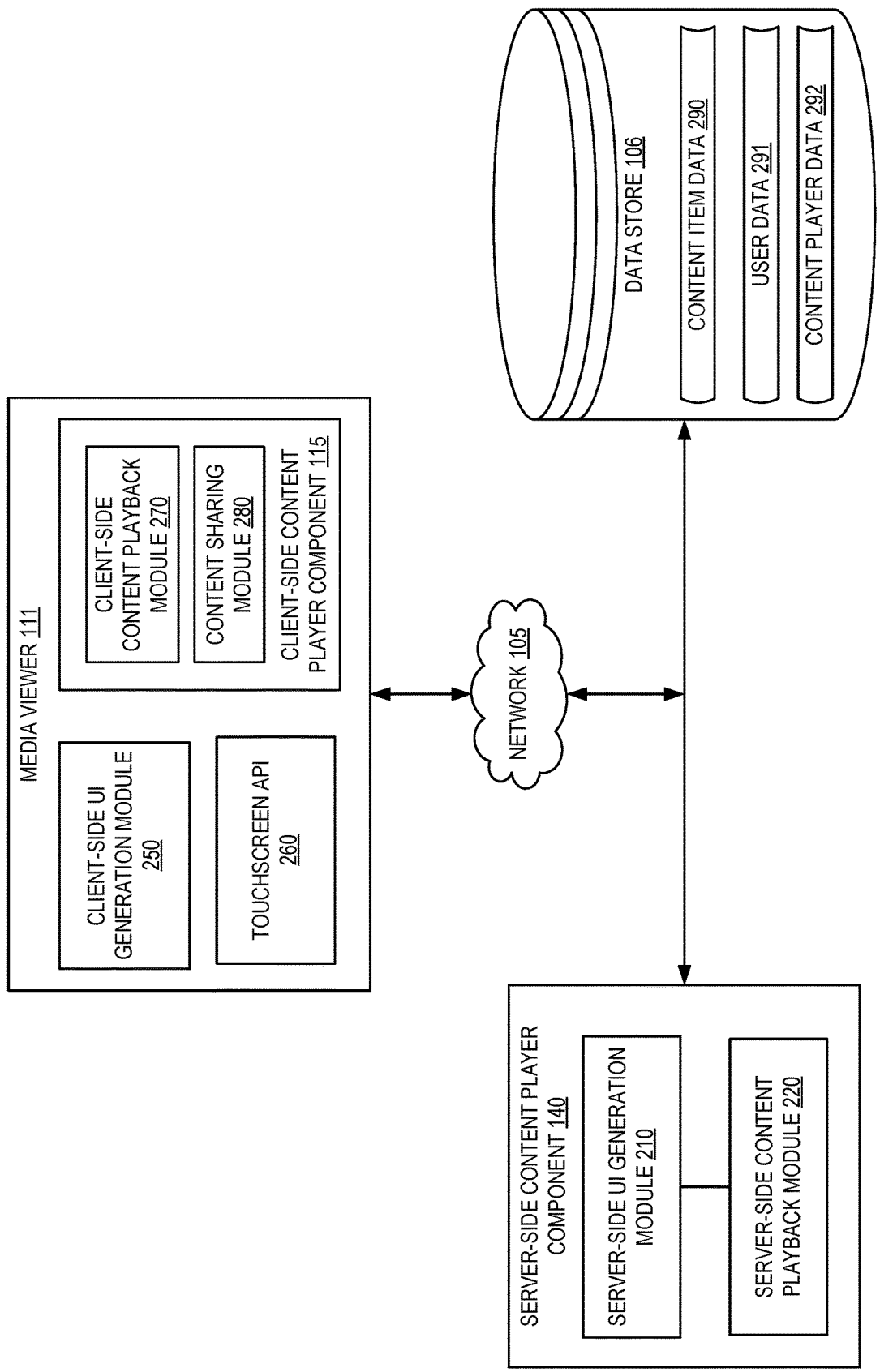
FIG. 2B is a block diagram illustrating content player components in accordance with one implementation of the disclosure.

As illustrated in FIG. 2A, operating system 202 can provide a content player application program interface (API) 204 that can provide various content playback functions. As will be discussed in conjunction with FIG. 2B, content player API 204 can provide playback of a content item (e.g., a content item 121 of FIG. 1) by communicating with the server-side content player component 140 of FIGS. 1 and 2B.

In some implementations, content player API 204 can provide playback of the content item in a cross-application content player on top of user interfaces provided by applications 206*a*-206*n* and/or operating system 202. For example, content player API 204 can overlay the cross-application content player on top of any user interface being presented on a screen of client deice 200, such as user interfaces described below in conjunction with FIGS. 3-6.

As another example, a first application running on client device 200 (e.g., application 206*a*) can provide user interfaces for presentation on client device 200. Additionally, the first application can provide playback of the content item on top of the user interfaces. In response to detecting a user request to switch from the first application to a second application (e.g., application 206*b*), content player API 204 can be invoked (e.g., by the first application, the second application or OS 202). Content player API 204 can then overlay the cross-application content player on top of user interfaces of the second application and can provide playback of the content item in the cross-application content player.

Each of applications 206*a*-206*n* can include a media viewer 111*a*-111*n* for providing the cross-application content player. As an example, application 206*a* provides one or more user interfaces for presentation on a screen of client device 200. Media viewer 111*a* can provide playback of a content item in a content player overlaid on the user interfaces. For example, as will be discussed below in conjunction with FIGS. 3-4, the playback of the content item can be provided in content players 310, 360, and 410 when user interfaces 300, 350, and 400 are presented on the screen of client device 200, respectively. As will be discussed in more detail in connection with FIG. 2B, media viewer 111*a-n* can provide playback of the content item by interacting and/or communicating with the server-side content player component 140 of FIG. 2B.

While media viewer 111*a* provides the playback of the content item, a user request pertaining to a second application can be received (e.g., media viewer 111*a* can determine that such a request has been received by implementing an event listener, or OS 202 can intercept such a request and notify media viewer 111*a*). As an example, the user request can be and/or include a request to share the content item using the second application (e.g., application 206*b*). As another example, the user request can be and/or include a request to present content (e.g., images, web pages, user interfaces, notifications, etc.) provided by the second application.

Responsive to the user request, media viewer 111*a* can continue playback of the content item in a cross-application content player. For example, as will be discussed below in conjunction with FIGS. 4-6, content players 460, 510*a*, 510b, and 632 can be overlaid on top of user interfaces 450, 500a, 500b, and 600, respectively.

In one implementation, media viewer 111a can invoke content player API 204 (e.g., by making an API call) responsive to the user request. Content player API 204 can then provide playback of the content item on top of user interfaces of application 206b.

In another implementation, media viewer 111b can invoke content player API 204 (e.g., by making an API call and/or by invoking API 204 via another application running on client device 202).

In another implementation, media viewer 111a can pass a play state that can be used to provide the playback of the content item in content players on top of interfaces provided by application 206b. The play state can include a video identifier that identifies the content item, a timestamp corresponding to the user request pertaining to the second application (e.g., a timestamp indicative of a position in the content item when a request to switch to the second application is received), session information (e.g., a user identifier, a session token, etc.) that can be used to request data from a server for providing playback of the content item, and/or any other information that can be used to provide the playback of the content item on top of application 206b. Media viewer 111a can pass the play state to media viewer 111b by providing a video object containing the play state, a video renderer (e.g., a function pointer that is pointed to the play state and/or the video object), and/or in any other suitable manner. Upon receiving the play state from media viewer 111a, media viewer 111b can invoke content player API 204 for providing playback of the content item on top of user interfaces provided by application 206b. Alternatively or additionally, as will be discussed in FIG. 2B, media viewer 111b can provide playback of the content item on top of user interfaces provided by application 206b by communicating with the server-side content player component 140 of FIGS. 1 and 2B.

FIG. 2B is a block diagram illustrating a client-side content player component 115 and server-side content player component 140 in accordance with some implementations of the disclosure. In one implementation, the server-side content player component 140 includes a server-side user interface (UI) generation module 210 and a server-side content playback module 220. More or less components may be included in the server-side content player component 140 without loss of generality. For example, two of the modules may be combined into a single module, or one of the modules may be divided into two or more modules. In one implementation, one or more of the modules may reside on different computing devices (e.g., different server computers). The media viewer 111 as illustrated in FIG. 2B can be and/or include one or more of the content player API 204 and the media viewers 11A-111N.

The media viewer 111 may be part of a client device, such as client device 110a-110Z of FIG. 1. Media viewer 111 may include a client-side UI generation module 250, a touch-screen application programming interface (API) 260, and a client-side content player component 115. In one implementation, the media viewer 111 is the same as its counterpart described with respect to FIG. 1. Client-side content player component 115 may include a client-side content playback module 270 and a content sharing module 280. More or less components may be included in the media viewer 111 and/or the client-side content player component 115 without loss of generality. For example, two of the modules may be combined into a single module, or one of the modules may be divided into two or more modules.

The server-side content player component 140 and the media viewer 111 may be communicatively coupled to each other and to the data store 106. For example, the server-side content player component 140 and the media viewer 111 may be coupled to each other and the data store 106 via a network (e.g., via network 105 as illustrated in FIG. 1). In another example, the server-side content player component 140 may be coupled directly to a server where the server-side content player component 140 resides (e.g., may be directly coupled to server 130).

The data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers). The data store 106 includes content item data 290, user data 291, and content player data 292.

The content item data 290 may include information related to content items 121 of FIG. 1 and/or any other content item. For example, the content item data 290 may include information that can be used to provide playback of the content items 121 (e.g., video content, audio content, metadata, etc.). In another example, the content item data 251 may include identifying information related to the content items 121 (e.g. content identifiers, uniform resource identifiers (URIs), etc.).

The user data 291 may include information related to users of a content sharing platform, such as the content sharing platform 120 of FIG. 1. For example, the user data 291 may include identifying information that can be used to identify the users, such as user identifiers associated with the users. In another example, the user data 291 may include information related to user accounts associated with the users, such as account identifiers, channel identifiers, etc. In some implementations, a given user can be associated with one or more user accounts on one or more platforms (e.g., the content sharing platform 120, the mobile platform 150, the social network platform 160, etc.).

The content item player data 292 can include any information that can be used to provide a content player for playback of a content item (e.g., the content item 121, a content item stored on a local storage of a client device, etc.). As an example, the content item player data 292 can include information about a position of the content player within a user interface, dimensions of the application content player (e.g., a layout width, a layout height, etc.), etc. As another example, the content item player data 292 can include play states and/or any other information related to the content item.

In one implementation, the client-side UI generation module 250 and/or the server-side UI generation module 210 can provide a UI for the content sharing platform to present to a user via media viewer 111. The UI may include menus and interfaces for the user to interact with the content sharing platform via media viewer 111. For example, the menus and interfaces may include a suggestions interface of what to watch next, a search interface for content items of the content sharing platform, a browsing interface for content items of the content sharing platform, a settings interface, a subscriptions interface, a playlists interface, a favorites interface, a history interface, an uploads interface, and so on. When the user selects a content item to view via one of the menus or interfaces, or when the media viewer is initially opened as a result of the user's selection of a content item in a different application on the client device than the media viewer 111, the client-side UI generation module 250 may provide a content player for playback of the selected content item.

As part of providing the content player, client-side UI generation module 250 may receive content item data 290, user data 291, and/or content player data 292 from the content sharing platform 120 and/or the server 130. For example, client-side UI generation module 250 may receive this data 290, 291, 292 in response to a user selection of the content item for playback via a menu or interface of the media viewer 111. In some implementations, content item data 290 is streamed to media viewer 111 by content sharing platform for playback by media viewer 111 to the user.

In one implementation, the client-side UI generation module 250 may pass the received data 290, 291 onto client-side content player component 115 to generate a content player for playback of the content item at media viewer 111. The content player may be presented in a variety of formats, depending on a type of client device and/or the actions of the user on the client device. Data corresponding to the generated content player, such as format and user preferences, may be stored in content player data 292 of data store 106. In one implementation, when the content player is generated, the UI of the media viewer 111 may include both the content player and an information section. The content player provides playback of a current media item (e.g., a media item selected from a playlist). The information window may display information regarding the current content item shown in the content player and/or a list of content items pertaining to the current media item (e.g., recommended content items related to the current media item, a playlist including current media item, etc.). In other implementations, the content player may encompass the entire UI of media viewer 111.

In other implementations, server-side content player component 140 can generate the content player. The server-side content player generation module 210 sends data for generating the content player to the media viewer 111. In some implementations, the server-side content player generation module 210 may interact with the client-side UI generation module 250 to determine the format and other client-device specific features for the content player to be displayed in the content sharing platform UI of the media viewer 111. Media viewer 111 may then display the UI and content player based on the received data from server-side content player component 140. In other implementations, the server-side content player component 140 and the client-side content player component 115 may cooperate to generate the content player at media viewer 111.

In one implementation, the client device can provide a touchscreen API 260 to the media viewer 111 to enable gesture detection and/or recognition. The touchscreen API 260 can detect one or more gestures made on a touchscreen of the client device. The touchscreen API 260 can also translate the detected gestures into data signals that can be processed by the media viewer 111 and/or any other application running on the client device. In one example, when a user of the client device places one or more fingers on the touchscreen, the touchscreen API 260 detects a touch event and gathers information related to the touch event (e.g., the position of the user's fingers, the pressure placed by the user's fingers, the size of the touchscreen selected by the user's fingers, the length of the touch event, etc.). The touchscreen API 260 then processes the information related to the touch event to determine if the touch event corresponds to a gesture. Examples of the gesture include "touch," "press," "swipe," "drag," "double touch," "pinch," and/or any other gesture recognizable by the client device.

Upon detecting a gesture, the touchscreen API 260 can provide information related to the gesture to the other components of the media viewer 111 (e.g., the client-side content playback module 270, the client-side UI generation module 250, etc.) and/or any other application for processing. For example, the client-side content playback module 270 can determine and/or perform an action corresponding to the gesture based on the information. Additionally or alternatively, the touchscreen API 260 can provide the information to the server-side content player generation module 210 for similar processing.

As described above, the media viewer 111 may provide content playback functionality across multiple applications. As an example, the media viewer 111 may provide playback of a content item (e.g., a video) in a content player that can be persistently visible to a user of a client device (e.g., a client device 110A of FIG. 1) when the user interacts with user interfaces of applications running on the client device.

In one implementation, while the user interacts with a user interface of a first application (also referred to as "first user interface"), the client-side content playback module 270 and/or the server-side content playback module 220 can provide a content player (also referred to as "first content player") for playback of the content item within the first user interface. In one implementation, the first user interface can be provided by the client-side UI generation module 250 and/or the server-side UI generation module 210 as described above. In another implementation, the first user interface can be provided by any other application running on the client device.

In one implementation, one or more portions of the content item can be stored in a local storage on the client device. In another implementation, the content item can be provided (e.g., streamed, broadcast, etc.) by the content sharing platform 120 and/or any other platform that can provide a content item. As an example, the playback of the content item can be provided using the content item data 290 stored in the data store 106.

In some implementations, during the playback of the content item, the client-side content playback module 270 can store information related to the playback of the content item in a local storage on the client device, the data storage 106 and/or any other storage. As an example, the information can include play states of the content item, such as a timestamp or any other data corresponding to a playback position of the content item. As another example, the information can include identifying information related to one or more portions of the content item, such as a Uniform Resource Identifier (URI) associated with the content item. As yet another example, the information can include any information that can be used to authenticate the user and/or client device for playback of the content item, such as a user identifier, a password, a session identifier, etc. The information related to the playback of the content item can be stored periodically, at random time instances, upon detecting an event (e.g., an input event initiating sharing of the content item), or at any other suitable time.

In implementations of the disclosure, the first content player can be persistently visible to the user while playing back the content item to provide a "watch-while" experience. As an example, the user may minimize the first content player into a smaller view (also referred to as a "mini-player") in the first user interface or any other user interface of the first application. With the content player minimized, the user can browse and interact with other interfaces, functions, and menus provided by the first application while consuming the content item. For example, the other interfaces, functions, and menus may include a suggestions interface of what to watch next, a search interface for content items of the content sharing platform, a browsing interface for content items of the content sharing platform, a settings interface, a subscriptions interface, a playlists interface a favorites interface, a history interface, an uploads interface, etc. As will be discussed in further detail in conjunction with FIG. 3, the user may interact with these interfaces, functions, and menus without interrupting playback of the content item.

The mini-player can be located in any suitable position within the first user interface and/or the other user interfaces of the first application. For example, the media viewer 111 can place the mini-player in a particular portion of the first user interface upon receiving a user input identifying the portion of the first user interface (e.g., a gesture moving (e.g., dragging, swiping, etc.) the mini-player to the portion of the first user interface). As another example, the media viewer 111 can place the mini-player in a default portion of the first user interface. The first content player and/or the mini-player may also be minimized, maximized, and/or dismissed via gesture controls that are relative to the content player portion of the media viewer UI.

While providing playback of the content item in the first content player and/or the mini-player, the media viewer 111 may receive a user request pertaining to a second application. In one example, the user request can be and/or include a request to launch the second application on the client device. As another example, the user request can be and/or include a request to share the content item using the second application and/or a platform associated with the second application. As still another example, the user request can be and/or include a request for a user interface of the second application. In one implementation, the user request can correspond to a user selection of a portion of the first user interface that corresponds to the user interface of the second application, such as a link, an image, a video annotation, etc. In some implementations, the user request corresponds to one or more gestures detected by the touchscreen API 260.

The second application can be provided by any service and/or platform, such as the content sharing platform 120, the mobile platform 150, the social network platform 160, etc. The second application can provide any functionality, such as content sharing functionality, social networking functionality, messaging functionality, chat functionality, email functionality, mapping service, etc.

The media viewer 111 can cause the playback of the content item to continue without interruption while the user interacts with the second application. For example, while a user interface of the second application (also referred to herein as "second user interface") is presented on the client device, the client-side content playback module 270 and/or the server-side content playback module 220 can provide a second content player for playback of the content item in the second user interface. In one implementation, the second content player can be overlaid on the second user interface. In another implementation, the second content player can be an embedded video player. The second application can define the size and/or position of the second content player.

The playback of the content item can continue in the second content player without interruption. For example, the client-side content playback module 270 can retrieve a current play state of the content item. The current play state can include a time stamp, a Uniform Resource Identifier (URI), and/or any other information that can be used to determine a playback position in the content item corresponding to the user request. The playback of the content item can then continue in the second content player from the playback position.

In one implementation, the client-side content playback module 270 can retrieve the current play state from the local storage that stores play states of the content item. In another implementation, the client-side content playback module 270 can retrieve the play state from a platform that provides the content item (e.g., the content sharing platform 120). As an example, the client-side content playback module 270 may retrieve, from the local storage, information that can be used to authenticate the user and/or a user account associated with the user, such as a user identifier, a password, a session identifier, etc. The media viewer 111 can then authenticate the user and/or the user account with the platform using the retrieved information. Upon successfully authenticating the user and/or the user account, the platform can transmit, to the media viewer 111, the current play state and/or any other data for use to provide playback of the content item.

In some implementations, the second content player can be a smaller view of the first content player. The second content player can be implemented in any of a variety of sizes and is not limited to a specific position within a user interface of the second application. The second content player can also be moved (e.g., dragged, swiped, etc.) within the second user interface or any other user interface of the second application to suit the user's preferences.

During the playback of the content item, the media viewer 111 can also provide content sharing functionality. For example, the content sharing module 280 can cause the content item to be shared with one or more other users in response to detecting an input event initiating sharing of the content item. In one implementation, the input event corresponds to one or more gestures recognized by the touchscreen API module 260, such as a "drag" gesture, a "drop" gesture, a "tap" gesture, etc. In another implementation, the input event corresponds to any user input that initiates the sharing of the content item.

In some implementations, the second user interface can include a text box for providing email, chat, messaging, content sharing, data entry, and/or any other functionality. The input event initiating sharing of the content item can correspond to one or more user inputs that move the second content player to the text box. In one implementation, as will be discussed in more detail in conjunction with FIG. 5, the user may drag the second content player to the text box to initiate sharing of the content item. In one implementation, the content sharing module 280 causes a link to the content item and/or any other information of the content item to be pasted in the text box upon detecting the input event. In another implementation, the media viewer 111 notifies the second application of the input event. The second application then pastes information of the content item in the text box and/or causes the content item to be shared with one or more other users upon receiving the notification.

In some implementations, the media viewer 111 can provide playback of the content item while a notification interface is presented on the client device. The notification interface can be presented in association with a home screen, a lock screen, a notification center, an application user interface, and/or any other user interface provided by an operation system of the client device and/or any application running on the client device. The notification interface can include notifications and any other information provided by an operating system of the client device and/or one or more applications running on the client device (e.g., information related to news, stocks, weather, application updates, etc.). In one implementation, a notification interface 600 of FIG. 6 can be presented.

The media viewer 111 can cause the playback of the content item to continue in the notification interface. As an example, the client-side content playback module 270 can provide a content player for playback of the content item (also referred to herein as the "third content player") within the notification interface. While the user interacts with the notification interface, the third content player persists on the top of the notification interface.

In one implementation, the third content player provides playback of both video content and audio content associated with the content item when the notification interface is presented on the client device. In another implementation, the audio content associated with the content item can be played when the notification interface is not presented on the client device. As an example, the client-side content playback module 270 can provide playback of the audio content in response to detecting an input event corresponding to minimization or dismissal of the notification interface (e.g., a user selection of a minimization or dismissal icon on the notification interface, a "swipe" gesture, and/or any other user input indicative of a user request to minimize or dismiss the notification interface). In one implementation, the client-side content playback module 270 can request and receive data for use to provide playback of the audio content from the content platform 120 or any other platform. The received data can include a current play state of the audio content, audio data, and/or any other data that can be used to provide playback of the audio content. In another implementation, the client-side content playback module 270 can receive the data for use to provide playback of the audio content from a local storage on the client device.

The client-side content playback module 270 can also resume playback of the content item (e.g., the video content and the audio content associated with the content item) in the third content player in response to detecting an input event corresponding to presentation of the notification interface (e.g., a "swipe" gesture on the client device and/or any other user input indicative of a user request for presentation or maximization of the notification interface). In one implementation, the client-side content playback module 270 can request and receive data for use to provide playback of the content item from the content platform 120 or any other platform. The received data can include a current play state of the content item, audio data, video data, and/or any other data that can be used to provide playback of the content item, etc. In another implementation, the client-side content playback module 270 can receive the data for use to provide playback of the content item from the local storage on the client device.

FIGS. 3-6 illustrate examples of user interfaces for providing a cross-application content player in accordance with some implementations of the disclosed subject matter. In some implementations, one or more portions of user interfaces shown in FIGS. 2-6 can be provided by the media viewer 111 and/or the server-side content player component 140 as described above in connection with FIGS. 1-2. The user interfaces can be presented on a client device (a client device 110A).

FIG. 3 illustrates examples of application user interfaces 300 and 350 in accordance with some implementations of the disclosure. User interface 300 and/or 350 can be provided by the first application as described above in conjunction with FIGS. 1 and 2.

As shown, user interface 300 can include a content player 310 that can be used to provide playback of a content item (e.g., a video). Content player 310 can be provided by the media viewer 111 and/or the server-side content player component 140 as described above in conjunction with FIGS. 1 and 2. In some implementations, the content item can be played along with information related to the content item, such as a title of the content item, a thumbnail image representative of the content item, and any other information related to the content item.

User interface 300 can include one or more user interface elements 320 for presenting information related to the content item currently playing, such as information about a channel that provides the video, information about content items that are related to the video (e.g., content items having the same or similar topics, genres, keywords, etc.), etc.

A user of the client device can interact with user interface 300 and/or any other user interface presented on the client device without interrupting the playback of the content item. In one example, the user may initiate sharing of the video with one or more other users by selecting a "share" button 312. As will be described in further detail below in connection with FIGS. 4-5, while one or more user interfaces for sharing the content item are presented on the client device, the playback of the content item continues without interruption.

In still another example, the user may minimize the content player 310 within user interface 300 by selecting a minimization indicator 314. Alternatively or additionally, content player 310 can be minimized by the media viewer 111 in response to detecting one or more user gestures (e.g., swiping down in the content player 310, dragging the content player 310 to a portion of the user interface 300, etc.).

In one implementation, user interface 350 is an example of an application user interface that can be presented to the user responsive to the minimization action(s). As illustrated, user interface 350 can include a content player 360 for providing playback of the video. The content item can be played in content player 360 based on a current play state of the content item (e.g., a timestamp and/or any other information indicative of a playback position in the content item corresponding to the minimization action(s)). Content player 360 can be provided by the media viewer 111 and/or the server-side content player component 140 as described above in conjunction with FIGS. 1 and 2.

User interface 350 may also include interfaces for videos 372, channels 374, playlist 376, searching 378, and a home menu 380. As shown in FIG. 3, the playlist interface 376 is currently active and displaying multiple playlist items 382. The user can navigate these interfaces and menus while content player 360 continues uninterrupted playback of the content item. For example, responsive to a user selection of the channel menu 374, a new interface (not shown in FIG. 3) can be presented to the user. The content player 360 can persist on the new interface and can continue to provide playback of the content item.

Content player 360 can be dismissed responsive to one or more gestures (e.g., swiping the content player 360 towards a direction). Content player 360 can also be maximized to its original or default content player format (e.g., content player 310) responsive to a user selection of home button 380, swiping the content player 360 towards a direction, pinching the content player 360, and/or using any other gesture.

While content player 360 is positioned at the bottom right corner of user interface 350 as shown in FIG. 3, this is merely illustrative. Content player 360 can be positioned in any portion of user interface 350. In some implementations, content player 360 may be positioned in a portion of user interface 350 identified by the user. For example, the user may identify the portion of the user interface 350 by moving (e.g., dragging) content player 360 to the portion of user interface 350.

Turning to FIG. 4, examples of user interfaces 400 and 450 for providing content sharing functionality in accordance with some implementations of the disclosed subject matter is shown. User interfaces 400 and/or 450 may be presented responsive to an input event initiating sharing of the content item (e.g., a user selection of "share" button 312 of FIG. 3, a voice command, etc.).

As illustrated, user interface 400 can include a content player 410 for providing playback of the content item. The content item can be played in content player 410 based on a current play state of the content item (e.g., a timestamp and/or any other information indicative of a playback position in the content item corresponding to the input event initiating sharing of the content item). Content player 410 can be provided by the media viewer 111 and/or the server-side content player component 140 as described above in conjunction with FIGS. 1 and 2.

User interface 400 can also include a content sharing interface 420 that presents information of one or more applications and/or platforms via which the content item can be shared. User interface 450 can then be presented to the user responsive to a user selection of one or more of the applications and/or platforms. The playback of the video can continue by content player 460 in user interface 450. Content player 460 can be provided by the media viewer 111 and/or the server-side content player component 140 as described above in conjunction with FIGS. 1 and 2.

In some implementations, user interface 450 may also include a content sharing interface 470 for sharing information about the content item via the application and/or platform selected by the user. Content sharing interface 470 can include a privacy setting option 472. In one implementation, the user may indicate that information related to the content item is to be accessible to all users of the platform using the privacy setting option 472. In another implementation, the user may indicate that information related to the content item is to be accessible to one or more selected users of the platform using the privacy setting option 472.

Content sharing interface 470 can also include a text box 474 that can be used to enter text, images, and/or any other content to be shared along with information related to the video. The user may initiate sharing of the video by selecting a share button 476. The sharing can be cancelled in response to receiving a user selection of a cancel button 478.

In one implementation, the user may move (e.g., drag) content player 460 towards and/or into text box 474 to share the video. In response to detecting the user's gesture to begin to move content player 460 (e.g., by selecting one or more portions of content player 460) and/or to release content player 460 within text box 474, the media viewer 111 may cause information related to the content item (e.g., a link to the content item, a description of the content item, an image of the content item, etc.) to be pasted in the text box. In another implementation, the information related to the content item can be shown in text box 474 in response to the user selection of the platform and/or application using sharing interface 420.

Figure 5:
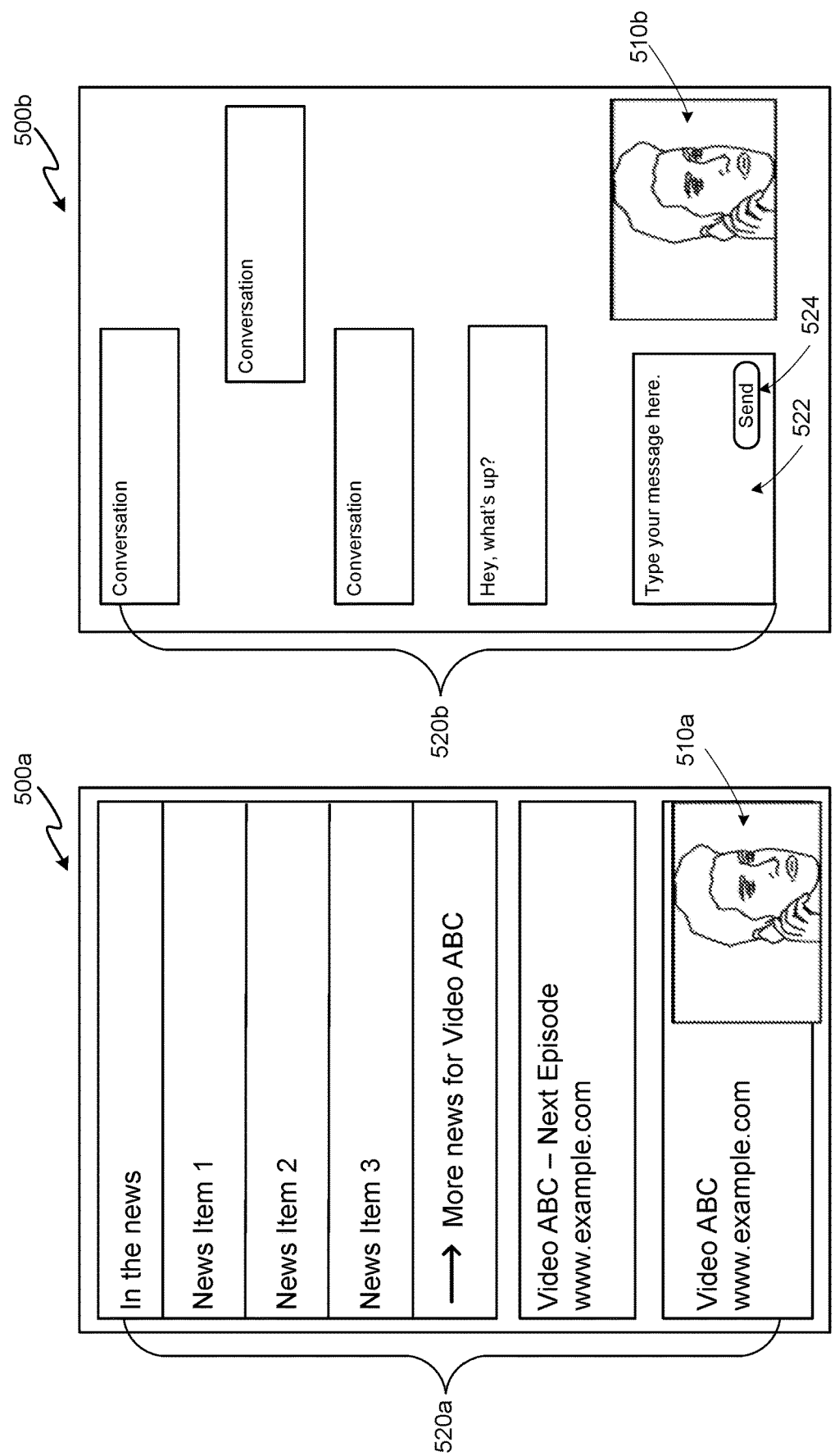

Turning to FIG. 5, examples of user interfaces 500a and 500b for providing a content player across multiple applications in accordance with some implementations of the disclosure are shown. In one implementation, user interfaces 500a and/or 500b can be presented to the user responsive to a user request pertaining to a second application (e.g., a chat application, a messaging application, a social network application, etc.).

As illustrated, user interface 500a-500b may include a content player 510a-510b for providing playback of the content item. Content player 510a-510b can persist on top of user interface 500a-500b and can continue playback of the content item while the user interacts with user interface 500a-500b and/or other user interface of the second application. Content player 510a-510b can be provided by the media viewer 111 and/or the server-side content player component 140 as described above in conjunction with FIGS. 1 and 2.

User interface 500a-500b can also include various user interface (UI) elements for providing functionality of the second application. As an example, user interface 500a can include one or more UI elements 520a for presenting information related to the video, such as news related to the content item, web pages related to the content item, images related to the content item, etc.

As another example, user interface 500b can include one or more UI elements 520b for providing chat functionality to the user. In one implementation, UI elements 520b may include a text box 522 that can be used to enter text, images, audio content, video content, and/or any other content. The user can send the content in text box 522 to one or more other users by selecting a "send" button 524. The user may also move content player 510b towards and/or into text box 522 to initiate sharing of the content item with the other user(s). In one example, information related to the content item (e.g., a link to the content item) can be pasted in text box 522 upon when the user drags content player 510b towards text box 552 and drops content player 510b. The playback of the content item continues in content player 510b while the user drags and/or drops content player 510b.

Figure 6:
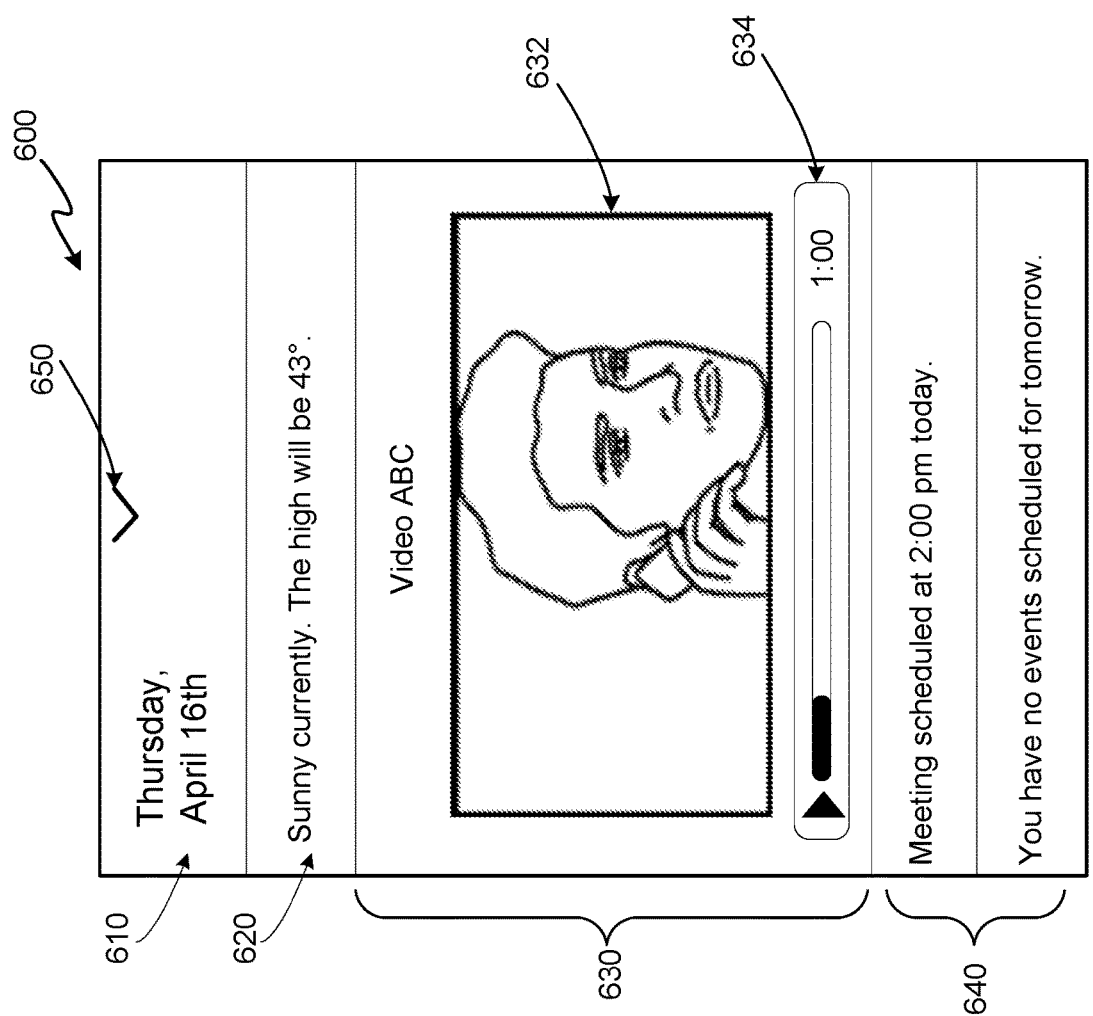

FIG. 6 illustrates an example of a notification interface 600 in accordance with some implementations of the disclosure. Notification interface 600 can be presented in association with a home screen, a lock screen, a notification center, an application interface, and/or any other user interface provided by an operating system of the client device or any application running on the client device.

As illustrated, user interface 600 can include one or more notification items 610, 620, 630, and 640. Each of notification items 610, 620, 630, and 640 can include text, video content, audio content, graphics, and/or any other content. Each of notification items 610, 620, 630, and 640 can include any information provided by the operating system of the client device and/or one or more applications running on the client device.

Notification item 630 can include a content player 632 for providing playback of the content item. Content player 632 can be provided by the media viewer 111 and/or the server-side content player component 140 as described above in conjunction with FIGS. 1 and 2. Notification item 630 can also include a playback control component 634 for controlling the playback of the video (e.g., rewinding, forwarding, pausing, etc. the playback of the video).

Notification interface 600 can also include a minimization indicator 650. The user may minimize and/or dismiss notification interface 600 by selecting the minimization indicator 650 and/or using one or more gestures (e.g., swiping towards a direction). When the notification interface 600 is minimized and/or dismissed, the media viewer 111 can play audio content associated with the content item.

Figure 7A:
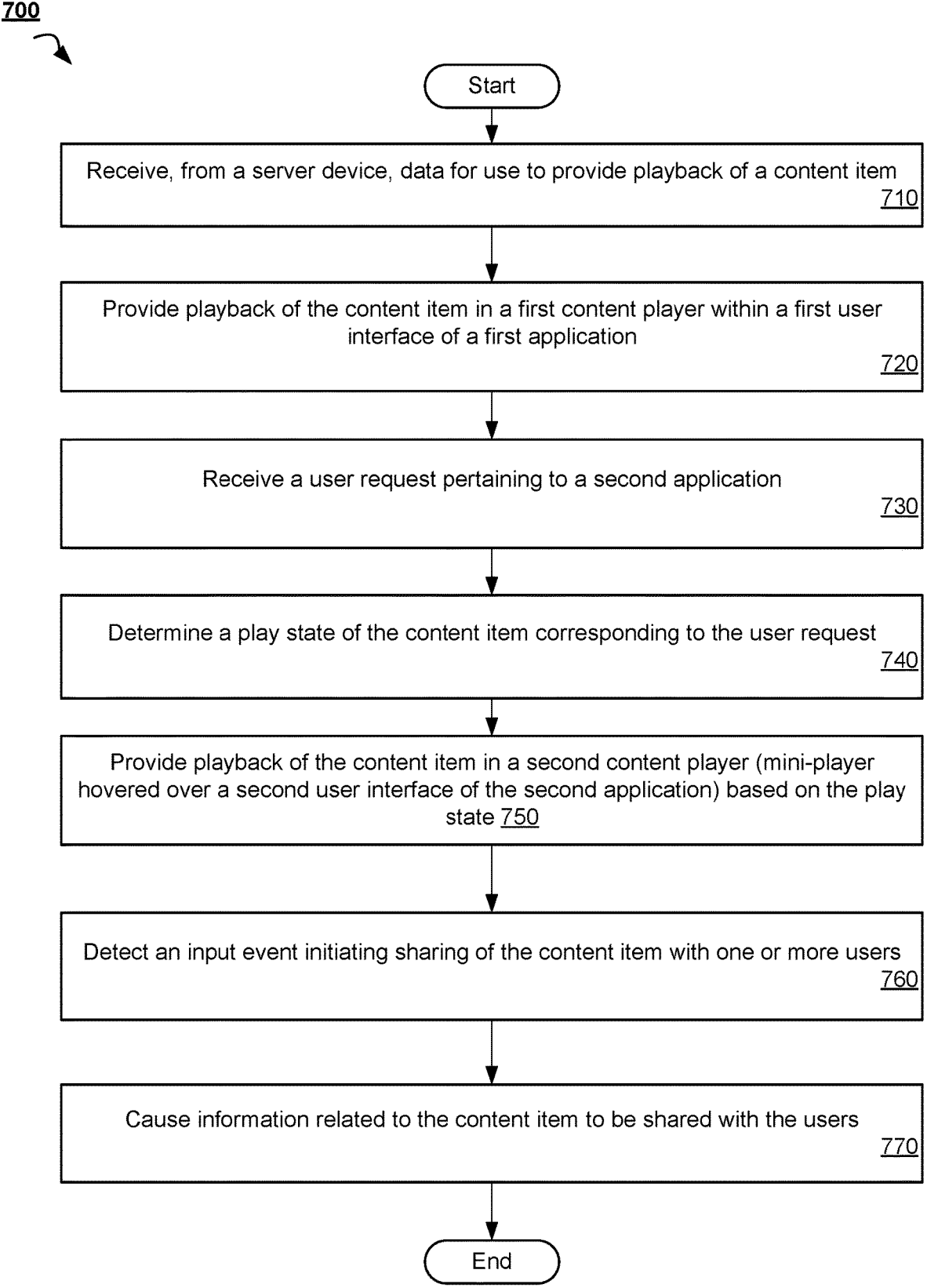
FIGS. 7A and 7B are flow diagrams illustrating methods for providing a cross-application content player by a client device, according to some implementations of the disclosure.
Figure 7B:
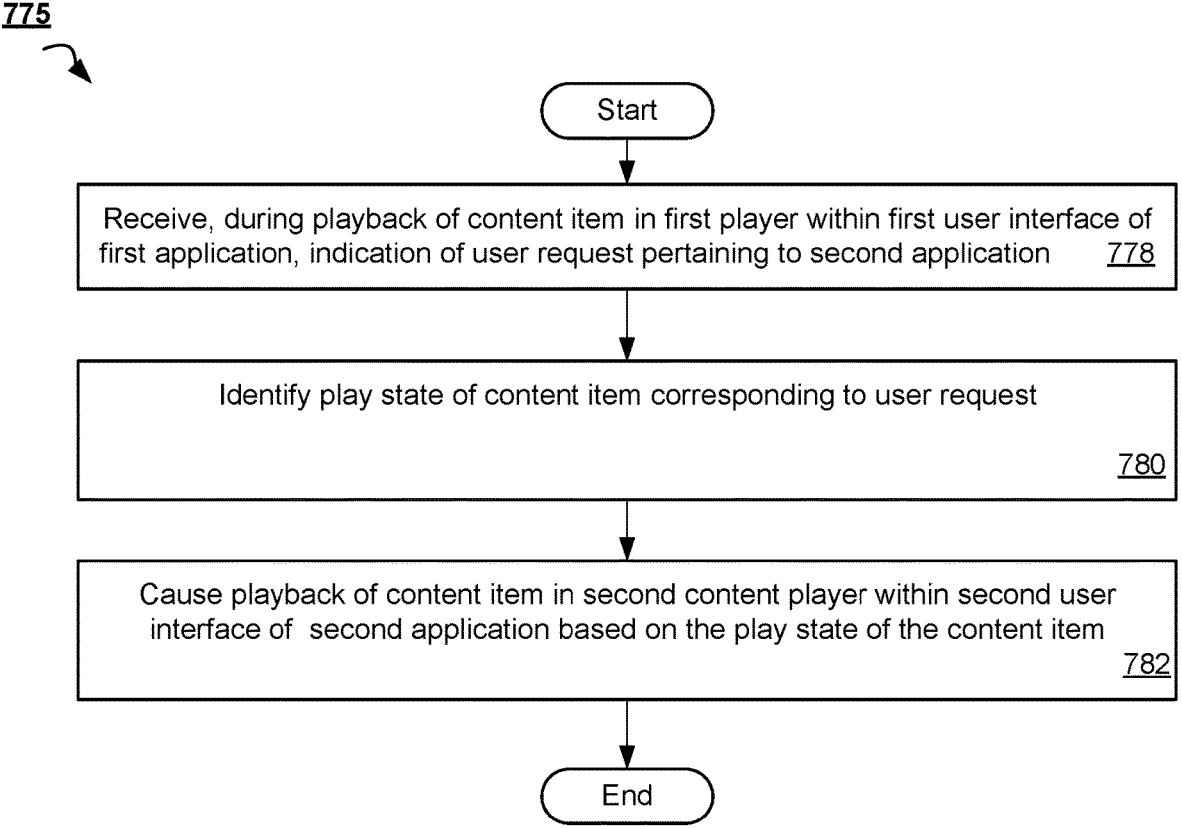

FIGS. 7A and 7B are flow diagrams illustrating methods for providing a cross-application content player by a client device, according to various implementations of the disclosure. The methods may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 7A, method 700 may be performed by a processing device executing the media viewer 111 on the client device as shown in FIGS. 1 and 2.

As illustrated, method 700 begins at block 710 when the processing device receives, from a server device, data for use to provide playback of the content item. In one implementation, the received data can include and/or be the content item data 290 and/or content player data 292 as described above in connection with FIG. 2.

At block 720, the processing device can provide playback of the content item in a first content player within a first user interface of a first application (e.g., a first mobile application associated with a first platform such as a content sharing platform). In some implementations, the first content player can be persistently visible to a user of the client device while the user interacts with the first application.

At block 730, the processing device can receive an indication of a user request pertaining to a second application (e.g., a second mobile application associated with a second platform other than the first platform). In one example, the user request can include and/or be a request to share the content item using the second application (e.g., an email application, a messaging application, a social network application, etc.). In another example, the user request can include and/or be a request for a user interface of the second application (e.g., a user selection of a link or any other UI element directed to the user interface of the second application). The indication of the user request pertaining to the second application can be a notification (e.g., a message) provided by an event listener implemented by media viewer 111, or API 204 invoked by the second application or the OS of the client device.

At block 740, the processing device can determine a play state of the content item corresponding to the user request. In one implementation, the processing device receives information related to the play state from a local storage on the client device. In another implementation, the processing device receives information related to the play state from the server device.

At block 750, the processing device can provide playback of the content item in a second content player within a second user interface of the second application based on the play state. For example, the processing device can determine a playback position in the content item based on the play state. The processing device can then provide playback of the content item from the playback position. In some implementations, providing playback of the content item in the second content player within the second user interface may involve the first application (which has permission from the operating system of the client device to draw over the second application and optionally other applications), hovering a watch-while mini-player over the second user interface of the second application, where the second content player can represent the watch-while mini-player. In one implementation, the second user interface can be and/or include a notification interface as described above in connection with FIGS. 1, 2, and 6.

At block 760, the processing device can detect an input event initiating sharing of the content item with one or more users. In one example, the input event corresponds to a user input (e.g., a gesture) to move the second content player (e.g., the watch-while mini-player) within the second user interface (e.g., moving the second content player towards and/or into a text box in the second use interface or any other portion of the second user interface).

At block 770, the processing device can cause information related to the content item to be shared with the users. For example, the processing device causes the information to be pasted in a text box of the second user interface that provides chat, email, messaging, and/or any other functionality.

In other implementations, providing playback of the content item in the second content player within the second user interface may involve the first application or the second application invoking API 204, which then obtains the play state of the content item from the first application and passes this play state to the second application, as will be discussed in more detail below in conjunction with FIG. 7B.

Referring to FIG. 7B, method 775 may be performed by a processing device executing the API 204 on client device 200 as shown in FIG. 2.

As illustrated, method 775 begins at block 778 when the processing device receives, during playback of a content item in a first content player within a first user interface of a first mobile application, an indication of a user request pertaining to a second mobile application. The indication may be received from the first application or the second application when the first application or the second application invokes API 204, At block 780, the processing device identifies a play state of the content item corresponding to the user request. The play state of the content item may be requested by API 204 from the first application and/or provided to API 204 by the first application.

At block 782, the processing device causes playback of the content item in a second content player within a second user interface of the second mobile application based on the play state of the content item. The playback of the content item in the second content player can be caused by API 204 passing the play state of the content item to the second application, which then forwards it to the second content player (e.g., an embedded content player in the second user interface of the second mobile application).

Figure 8:
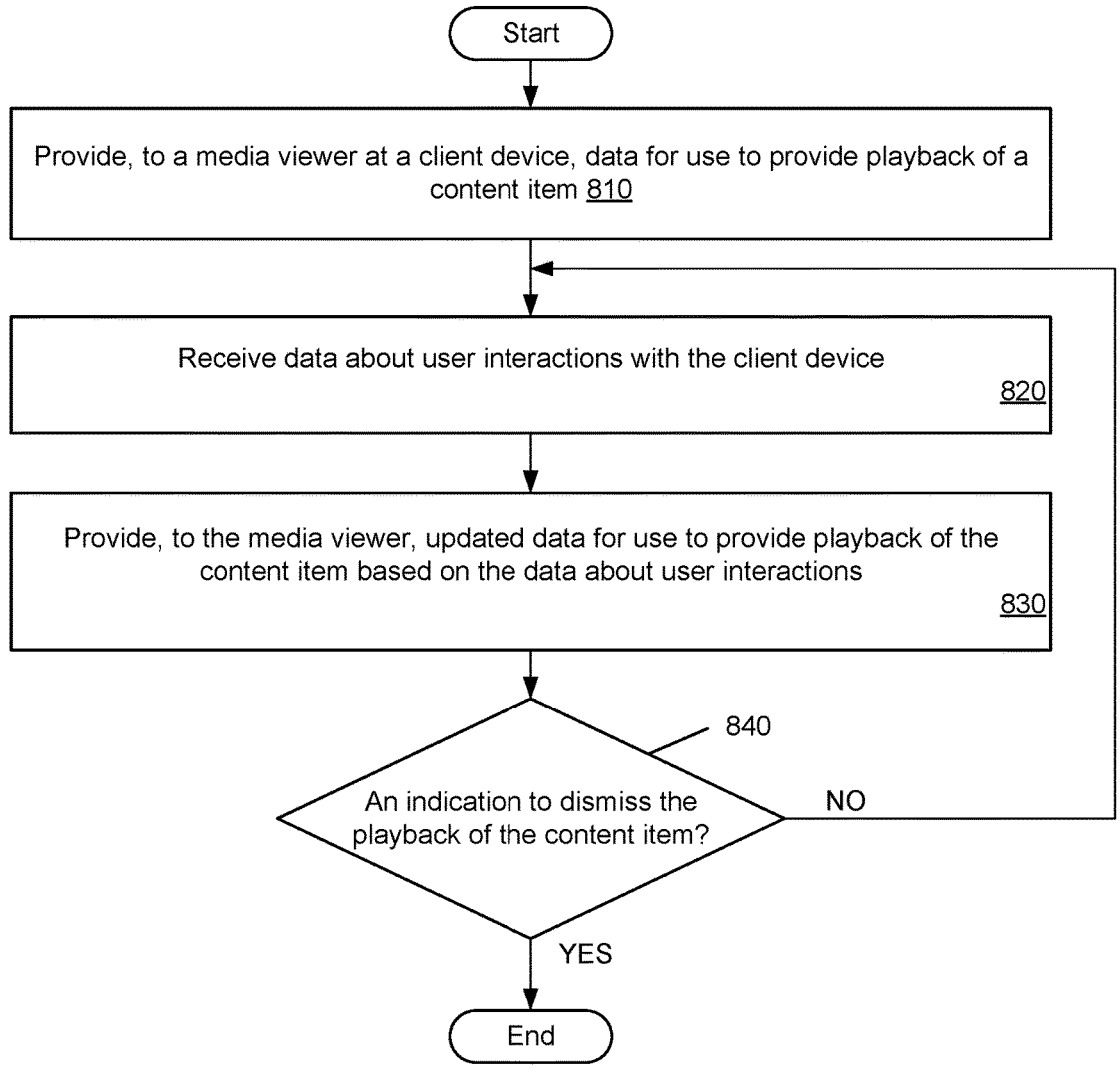
FIG. 8 is a flow diagram illustrating a method for providing a cross-application content player by a server device, according to some implementations of the disclosure.

FIG. 8 is a flow diagram illustrating a method 800 for providing a cross-application content player at a client device by a server device, according to an implementation of the disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. In one implementation, method 800 may be performed by a processing device executing the server-side content player component 140, as described above in conjunction with FIGS. 1 and 2.

As illustrated, method 800 begins at block 810 when the processing device provides, to a media viewer at a client device, data for use to provide playback of a content item. The data can include and/or be the content item data 290 and/or content player data 292 as described above in connection with FIG. 2. In one example, the data can be used to generate a content player for playback of the content item within a first user interface. The first user interface can be provided by a first application running on the client device, such as an application provided by a content sharing platform, a social network application, etc.

At block 820, the processing device can receive data about user interactions with the client device. For example, the data may include information about one or more user interactions corresponding to a user request pertaining to a second application (e.g., a user selection of a link directed to the second application and/or a user interface of the second application). As another example, the data may include information of one or more input events corresponding to minimization, dismissal, or maximization of a content player and/or a user interface that provides playback of the content item. As still another example, the data may include information related to an input event initiating sharing of the content item.

At block 830, the processing device can provide, to the media viewer, updated data for use to provide playback of the content item based on the data about the user interactions. For example, the updated data can include information related to a play state corresponding to the user interactions. As another example, the updated data can include data for use to provide playback of the content item in a mini-player within user interfaces of the first application. As yet another example, the updated data can include data for use to provide playback of the content item in a second content-player within a user interface of a second application. As still another example, the updated data can include data for use to provide playback of audio content and/or video content associated with the content item.

At block 840, the processing device can determine whether an indication to dismiss the playback of the content item has been received. The indication can correspond to one or more user inputs that dismiss a content player that provides playback of the content item.

In some implementations, the processing device can return to block 820 and can receive updated data about user interactions with the client device in response to determining that the indication has not been received. Alternatively, the processing device can conclude process 800 in response to receiving the indication.

Figure 9:
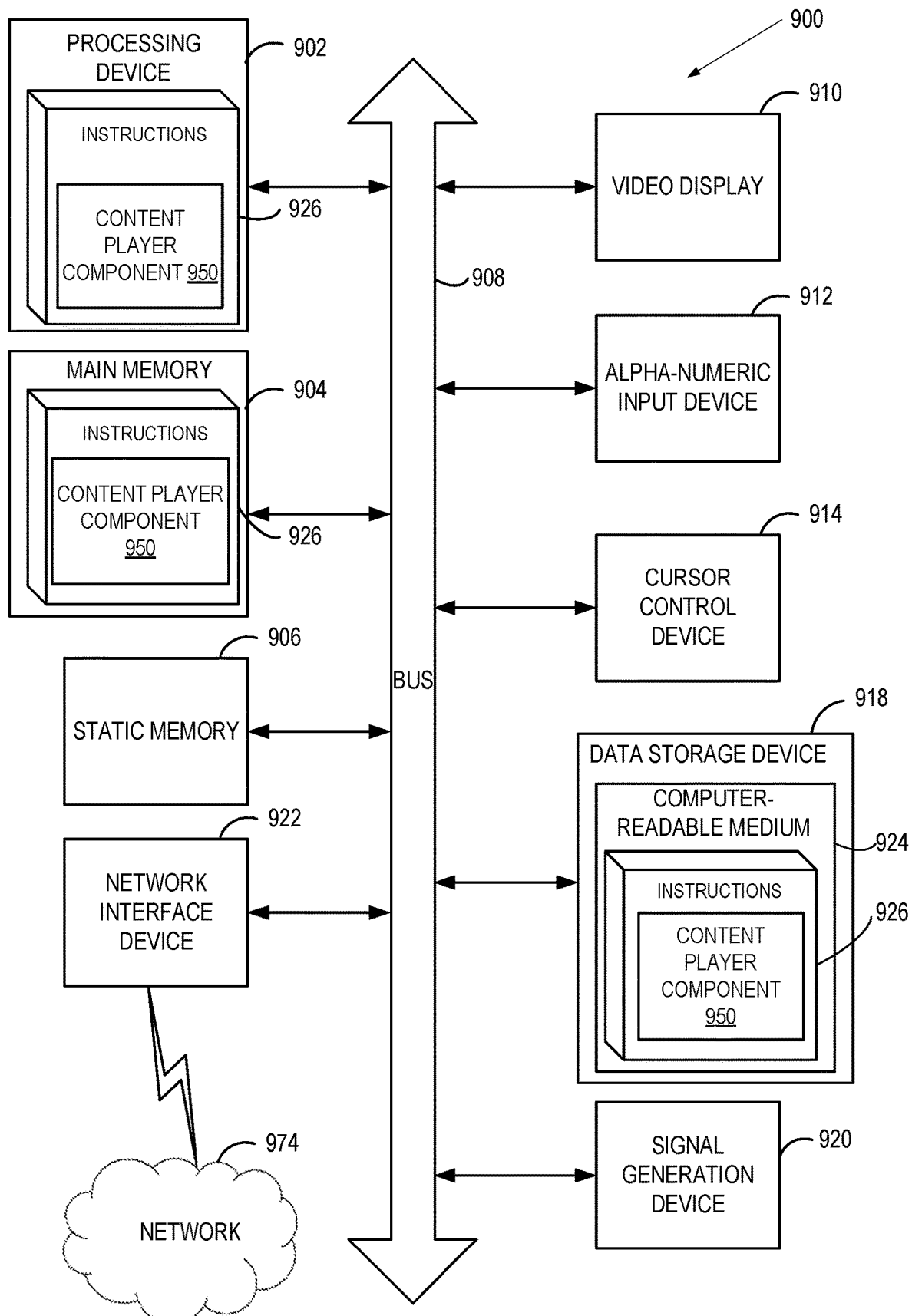
FIG. 9 is a block diagram illustrating an exemplary computer system, according to some implementations.

FIG. 9 illustrates a diagrammatic representation of a machine in the exemplary form of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processing device (processor) 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a data storage device 918, which communicate with each other via a bus 908.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 902 may also be one or more special-purpose processing devices such as an application specific integrated circuit (ASIC), a field programmable gate array (FPGA), a digital signal processor (DSP), network processor, or the like. The processor 902 is configured to execute instructions 826 for performing the operations and steps discussed herein.

The computer system 900 may further include a network interface device 922. The computer system 900 also may include a video display unit 910 (e.g., a liquid crystal display (LCD), a cathode ray tube (CRT), or a touch screen), an alphanumeric input device 912 (e.g., a keyboard), a cursor control device 914 (e.g., a mouse), and a signal generation device 920 (e.g., a speaker).

The data storage device 918 may include a computer-readable storage medium 924 on which is stored one or more sets of instructions 926 (e.g., software) embodying any one or more of the methodologies or functions described herein. The instructions 926 may also reside, completely or at least partially, within the main memory 904 and/or within the processor 802 during execution thereof by the computer system 900, the main memory 904 and the processor 902 also constituting computer-readable storage media. The instructions 926 may further be transmitted or received over a network 974 via the network interface device 922.

In one embodiment, the instructions 926 include instructions for a content player component 950, which may correspond, respectively, to the media viewer 111 and/or the server-side content player component 140 described with respect to FIGS. 1 and 2, and/or a software library containing methods that provide a dynamic size-adjustable content player for a content sharing platform. While the computer-readable storage medium 924 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "sending", "determining", "enabling", "identifying," "providing," "detecting," "retrieving," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
receiving, during playback of a content item in a cross-application content player within a first user interface of a first mobile application, an indication of a user request pertaining to a second mobile application, wherein the first mobile application is associated with a first platform, and the second mobile application is associated with a second platform, wherein the first user interface of the first mobile application is presented on a client device;
identifying a play state of the content item at a time corresponding to the user request;
causing, by a processing device, the playback of the content item to continue in the cross-application content player within a second user interface of the second mobile application based on the play state, wherein the second user interface of the second mobile application is presented on the client device, and wherein the cross-application content player persists on the first user interface and the second user interface to provide the playback of the content item in a continuous manner;
detecting an input event initiating sharing of the content item, the input event corresponding to a user interaction with the cross-application content player; and
causing the content item to be shared with a second cross-application content player in response to detecting the input event.

2. The method of claim 1, wherein detecting the input event comprises detecting a gesture to move the cross-application content player within the second user interface.

3. The method of claim 1, wherein causing the content item to be shared comprises causing information related to the content item to be pasted in a text box in the second user interface.

4. The method of claim 1, wherein the user request pertaining to the second mobile application comprises a request to share the content item using the second mobile application.

5. The method of claim 1, further comprising:
receiving a first indication to dismiss a notification interface, wherein the second user interface comprises the notification interface; and
causing, by the processing device, playback of audio content associated with the content item in response to receiving the first indication.

6. The method of claim 5, further comprising:
receiving a second indication to present the notification interface; and
causing, by the processing device, playback of the audio content and video content associated with the content item in response to receiving the second indication.

7. A method comprising:
receiving, during playback of a content item in a cross-application content player within a first user interface of a first mobile application, an indication of a user request pertaining to a second mobile application, wherein the first mobile application is associated with a first platform, and the second mobile application is associated with a second platform;
identifying a play state of the content item at a time corresponding to the user request;
causing, by a processing device, the playback of the content item to continue in the cross-application content player within a second user interface of the second mobile application based on the play state, wherein the first user interface of the first mobile application and the second user interface of the second mobile application are presented on one or more client devices, and wherein the cross-application content player persists on the first user interface and the second user interface to provide the playback of the content item in a continuous manner;
detecting an input event initiating sharing of the content item, the input event corresponding to a user interaction with the cross-application content player; and
causing the content item to be shared with cross-application content player in response to detecting the input event.

8. The method of claim 7, wherein detecting the input event comprises detecting a gesture to move the cross-application content player within the second user interface.

9. The method of claim 7, wherein causing the content item to be shared comprises causing information related to the content item to be pasted in a text box in the second user interface.

10. The method of claim 7, wherein the user request pertaining to the second mobile application comprises a request to share the content item using the second mobile application.

11. The method of claim 7, further comprising:
receiving a first indication to dismiss a notification interface, wherein the second user interface comprises the notification interface; and
causing, by the processing device, playback of audio content associated with the content item in response to receiving the first indication.

12. The method of claim 11, further comprising:
receiving a second indication to present the notification interface; and
causing, by the processing device, playback of the audio content and video content associated with the content item in response to receiving the second indication.

13. A system comprising:
a memory; and
a processing device communicatively coupled to the memory, the processing device to perform operations comprising:
receiving, during playback of a content item in a cross-application content player within a first user interface of a first mobile application, an indication of a user request pertaining to a second mobile application, wherein the first mobile application is associated with a first platform, and the second mobile application is associated with a second platform;
identifying a play state of the content item at a time corresponding to the user request;
causing the playback of the content item to continue in the cross-application content player within a second user interface of the second mobile application based on the play state, wherein the first user interface of the first mobile application and the second user interface of the second mobile application are presented on one or more client devices, and wherein the cross-application content player persists on the first user interface and the second user interface to provide the playback of the content item in a continuous manner;
detecting an input event initiating sharing of the content item, the input event corresponding to a user interaction with the cross-application content player; and
causing the content item to be shared with cross-application content player in response to detecting the input event.

14. The system of claim 13, wherein detecting the input event comprises detecting a gesture to move the cross-application content player within the second user interface.

15. The system of claim 13, wherein causing the content item to be shared comprises causing information related to the content item to be pasted in a text box in the second user interface.

16. The system of claim 13, wherein the user request pertaining to the second mobile application comprises a request to share the content item using the second mobile application.

17. The system of claim 13, the operations further comprising:
receiving a first indication to dismiss a notification interface, wherein the second user interface comprises the notification interface; and
causing playback of audio content associated with the content item in response to receiving the first indication.

18. The system of claim 17, the operations further comprising:
receiving a second indication to present the notification interface; and
causing playback of the audio content and video content associated with the content item in response to receiving the second indication.

19. A non-transitory machine-readable storage medium storing instructions which, when executed, cause a processing device to perform operations comprising:
receiving, during playback of a content item in a cross-application content player within a first user interface of a first mobile application, an indication of a user request pertaining to a second mobile application, wherein the first mobile application is associated with a first platform, and the second mobile application is associated with a second platform;

identifying a play state of the content item at a time corresponding to the user request;

causing the playback of the content item to continue in the cross-application content player within a second user interface of the second mobile application based on the play state, wherein the first user interface of the first mobile application and the second user interface of the second mobile application are presented on one or more client devices, and wherein the cross-application content player persists on the first user interface and the second user interface to provide the playback of the content item in a continuous manner;

detecting an input event initiating sharing of the content item, the input event corresponding to a user interaction with the cross-application content player; and causing the content item to be shared with cross-application content player in response to detecting the input event.

20. The non-transitory machine-readable storage medium of claim 19, wherein detecting the input event comprises detecting a gesture to move the cross-application content player within the second user interface.

21. The non-transitory machine-readable storage medium of claim 19, wherein causing the content item to be shared comprises causing information related to the content item to be pasted in a text box in the second user interface.

22. The non-transitory machine-readable storage medium of claim 19, wherein the user request pertaining to the second application comprises a request to share the content item using the second application.

23. The non-transitory machine-readable storage medium of claim 19, the operations further comprising:

receiving a first indication to dismiss a notification interface, wherein the second user interface comprises the notification interface; and causing playback of audio content associated with the content item in response to receiving the first indication.

24. The non-transitory machine-readable storage medium of claim 23, the operations further comprising:

receiving a second indication to present the notification interface; and causing playback of the audio content and video content associated with the content item in response to receiving the second indication.

* * * * *